(12) United States Patent
Dandekar et al.

(10) Patent No.: US 11,727,053 B2
(45) Date of Patent: *Aug. 15, 2023

(54) ENTITY RECOGNITION FROM AN IMAGE

(71) Applicant: Stripe, Inc., San Francisco, CA (US)

(72) Inventors: Pranav Dandekar, Palo Alto, CA (US);
Ashish Goel, Stanford, CA (US); Peter Lofgren, Palo Alto, CA (US); Matthew Fisher, Palo Alto, CA (US)

(73) Assignee: Stripe, Inc., San Francisco, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/231,580

(22) Filed: Apr. 15, 2021

(65) Prior Publication Data

US 2021/0374386 A1 Dec. 2, 2021

Related U.S. Application Data

(63) Continuation of application No. 16/414,306, filed on May 16, 2019, now Pat. No. 11,003,896, which is a
(Continued)

(51) Int. Cl.
*G06V 40/16* (2022.01)
*G06F 16/583* (2019.01)
(Continued)

(52) U.S. Cl.
CPC ............ *G06F 16/583* (2019.01); *G06F 16/51* (2019.01); *G06F 16/58* (2019.01);
(Continued)

(58) Field of Classification Search
CPC .... G06V 40/172; G06V 40/165; G06V 10/42; G06V 10/77; G06V 40/1306;
(Continued)

(56) References Cited

U.S. PATENT DOCUMENTS 8,885,984 B1   11/2014 Lavi et al.
9,396,412 B2   7/2016 Kuo et al.
(Continued)

FOREIGN PATENT DOCUMENTS

CN   106599856 A   *   4/2017
CN   106897366 A   *   6/2017   ............ G06F 16/51
(Continued)

OTHER PUBLICATIONS

U.S. Appl. No. 15/468,757 U.S. Pat. No. 10,311,288, filed Mar. 24, 2017, Determining Identity of a Person in a Digital Image.
(Continued)

*Primary Examiner* — Ian L Lemieux
(74) *Attorney, Agent, or Firm* — BakerHostetler (57) ABSTRACT

Aspects of the current disclosure include systems and methods for identifying an entity in a query image by comparing the query image with digital images in a database. In one or more embodiments, a query feature may be extracted from the query image and a set of candidate features may be extracted from a set of images in the database. In one or more embodiments, the distances between the query feature and the candidate features are calculated. A feature, which includes a set of shortest distances among the calculated distances and a distribution of the set of shortest distances, may be generated. In one or more embodiments, the feature is input to a trained model to determine whether the entity in the query image is the same entity associated with one of the set of shortest distances.

20 Claims, 8 Drawing Sheets

Related U.S. Application Data continuation of application No. 15/468,757, filed on Mar. 24, 2017, now Pat. No. 10,311,288.

(51) Int. Cl.

| | | |
|---|---|---|
| *G06F 16/51* | (2019.01) | |
| *G06F 16/58* | (2019.01) | |
| *G06V 40/13* | (2022.01) | |
| *G06V 10/77* | (2022.01) | |
| *G06V 10/762* | (2022.01) | |
| *G06F 18/214* | (2023.01) | |
| *G06V 10/764* | (2022.01) | |
| *G06V 20/30* | (2022.01) | |

(52) U.S. Cl.
CPC ........ *G06F 16/5838* (2019.01); *G06F 18/214* (2023.01); *G06V 10/764* (2022.01); *G06V 10/7625* (2022.01); *G06V 10/77* (2022.01); *G06V 10/7715* (2022.01); *G06V 20/30* (2022.01); *G06V 40/1306* (2022.01); *G06V 40/165* (2022.01); *G06V 40/172* (2022.01)

(58) Field of Classification Search
CPC ............ G06V 10/7625; G06F 16/5838; G06F 16/583; G06F 16/51; G06F 16/58; G06K 9/6256

See application file for complete search history.

(56) References Cited

U.S. PATENT DOCUMENTS

| | | | |
|---|---|---|---|
| 9,430,719 B2 | 8/2016 | Gokturk et al. | |
| 9,875,397 B2* | 1/2018 | Hwang | G06F 18/24133 |
| 10,311,288 B1 | 6/2019 | Dandekar et al. | |
| 10,509,952 B2 | 12/2019 | Kastaniotis et al. | |
| 11,003,896 B2 | 5/2021 | Dandekar et al. | |
| 2001/0036302 A1 | 11/2001 | Miller | |
| 2004/0076329 A1* | 4/2004 | Skarbek | G06V 40/16 |
| | | | 382/118 |
| 2004/0156535 A1* | 8/2004 | Goldberg | G11B 27/028 |
| | | | 707/E17.023 |
| 2004/0264780 A1 | 12/2004 | Zhang et al. | |
| 2005/0084154 A1 | 4/2005 | Li et al. | |
| 2006/0251292 A1 | 11/2006 | Gokturk et al. | |
| 2007/0036434 A1 | 2/2007 | Saveliev | |
| 2008/0152231 A1* | 6/2008 | Gokturk | G06Q 30/08 |
| | | | 382/209 |
| 2008/0240504 A1* | 10/2008 | Grosvenor | G06F 18/285 |
| | | | 382/103 |
| 2008/0304707 A1 | 12/2008 | Oi et al. | |
| 2009/0034805 A1 | 2/2009 | Perlmutter et al. | |
| 2010/0104158 A1 | 4/2010 | Shechtman et al. | |
| 2011/0158535 A1* | 6/2011 | Iio | G06K 9/6223 |
| | | | 382/190 |
| 2012/0106798 A1* | 5/2012 | Monden | G06V 10/762 |
| | | | 382/103 |
| 2012/0301032 A1 | 11/2012 | Kawanishi et al. | |
| 2013/0329059 A1* | 12/2013 | Uchikoshi | G06V 10/993 |
| | | | 348/207.1 |
| 2014/0025607 A1* | 1/2014 | Wang | G06F 16/9027 |
| | | | 706/12 |
| 2014/0363078 A1 | 12/2014 | Balestri et al. | |
| 2015/0049943 A1* | 2/2015 | Hamsici | G06F 18/2415 |
| | | | 382/218 |
| 2015/0098632 A1* | 4/2015 | Monta | G06K 9/6201 |
| | | | 382/118 |
| 2016/0012277 A1 | 1/2016 | Tate et al. | |
| 2016/0012280 A1* | 1/2016 | Ito | G06V 40/173 |
| | | | 382/305 |
| 2016/0063345 A1 | 3/2016 | Nomura et al. | |
| 2016/0180196 A1 | 6/2016 | Taylor | |
| 2017/0262472 A1* | 9/2017 | Goldenberg | G06F 16/583 |
| 2018/0137390 A1* | 5/2018 | Brundage | G06V 10/454 |
| 2018/0260801 A1* | 9/2018 | Chiarella | G06Q 20/227 |
| 2019/0171665 A1 | 6/2019 | Navlakha et al. | |
| 2019/0272412 A1 | 9/2019 | Dandekar et al. | |
| 2020/0117991 A1 | 4/2020 | Suzuki et al. | |

FOREIGN PATENT DOCUMENTS

| | | | | |
|---|---|---|---|---|
| CN | 108764106 A | * | 11/2018 | ......... G06K 9/00288 |
| CN | 111325185 A | * | 6/2020 | |

OTHER PUBLICATIONS

U.S. Appl. No. 16/414,306 U.S. Pat. No. 11,003,896, filed May 16, 2019, Entity Recognition From an Image.

"U.S. Appl. No. 15/468,757, Examiner Interview Summary dated Oct. 25, 2018", 3 pgs.

"U.S. Appl. No. 15/468,757, Non-Final Office Action dated Aug. 7, 2018", 16 pgs.

"U.S. Appl. No. 15/468,757, Notice of Allowance dated Jan. 18, 2019", 10 pgs.

"U.S. Appl. No. 15/468,757, Response filed Oct. 19, 2018 to Non-Final Office Action dated Aug. 7, 2018", 14 pgs.

"U.S. Appl. No. 16/414,306, Non-Final Office Action dated Sep. 8, 2020", 15 pgs.

"U.S. Appl. No. 16/414,306, Notice of Allowance dated Mar. 1, 2021", 8 pgs.

"U.S. Appl. No. 16/414,306, Response filed Dec. 8, 2020 to Non-Final Office Action dated Sep. 8, 2020", 10 pgs.

Amos, Brandon, et al., "OpenFace: A general-purpose face recognition library with mobile applications", *CMU School of Computer Science*, 6(2), Pittsburg, PA, (Jun. 2016), 20 pgs.

Pullen, Patrick J, "How Facebook Knows What You Look Like", [Online] Retrieved from the Internet: <URL:http://time.com/3951006/facebook-visual-recognition/>, (Jul. 9, 2015), 5 pgs.

Schroff, Florian, et al., "FaceNet: A Unified Embedding for Face Recognition and Clustering", *2015 IEEE Conference on Computer Vision and Pattern Recognition (CVPR)*, arXiv:1503.03832v3, (2015), 10 pgs.

\* cited by examiner

ENTITY RECOGNITION FROM AN IMAGE

CROSS-REFERENCE TO RELATED APPLICATIONS

This patent application is a continuation of and claims the priority benefit of co-pending and commonly-owned U.S. patent application Ser. No. 16/414,306, filed May 16, 2019, which is a continuation of and claims the priority benefit of co-pending and commonly-owned U.S. patent application Ser. No. 15/468,757, filed on Mar. 24, 2017, entitled "DETERMINING IDENTITY OF A PERSON IN A DIGITAL IMAGE," now issued as U.S. Pat. No. 10,311,288, which patent document is incorporated by reference herein in its entirety and for all purposes.

BACKGROUND

A. Technical Field

The present disclosure relates to identifying a person in an image, more particularly, to systems and methods for determining identity of a person in a query image by comparing the query image, which may be, e.g., a still image (photo) or a video image, with images from one or more databases.

B. Description of the Related Art

With the advent of networking technologies, multiple databases have been created that contain information and images of individuals, such as human resources personnel databases, picture databases, social networking sites (SNS), social media sites, internet marketplaces, and the like. Such databases and technologies can be used to enable people to interact with each other via databases of personal profiles, such as through social networking sites (SNS) like Facebook® and Twitter®, social media sites like YouTube® and Tripadvisor®, and marketplaces like eBay® and Airbnb®. For instance, in certain of the aforementioned examples a member or user creates a personal profile, which may be posted on a virtual bulletin board. Each personal profile typically includes text and video/photos that are uploaded from the member's computer and/or phone. In general, a site has a database that stores the user profile data of the members and helps the members to find/communicate with their contacts, who are generally called "friends."

Most Internet-based services allow users to easily create a profile. However, the information entered by users is usually unverified. This enables malicious users to easily create multiple fake identities for nefarious purposes such as spamming, defrauding, or free-riding. It is valuable for an Internet-based service to identify real/honest users vs. fake/malicious users. If a service is able to determine the identity of a person in an image, it allows that service to, e.g., identify fake identities that may be using the same fake photo in their image, and identity real identities by comparing their profile images to images from other external databases.

Some approaches have thus been attempted to identify the member in a given query image in a first database by matching the facial image in the query image to an image stored in a second database, such as a second SNS. However, the conventional approaches frequently fail. For example, existing methods do not work if the member did not upload an image of the member to the second database. Also, even if the member uploaded the photo, the query image might be taken at a different angle and/or environment than the photos in the second database, significantly reducing the success rate of the identification process. Moreover, since a typical image database, such as an SNS database, includes a large number of members and each member posts multiple photos, the matching process may require an intractable amount of computational resources or time. In addition, it is not uncommon that a member (e.g., a user of an SNS) includes something other than a photo of themselves when creating their profile, such as use an image of a celebrity as their profile picture instead of a picture of themselves. Such cases are particularly problematic to current approaches that employ straightforward photo matching. In such a case, the conventional approaches would not work properly since a large number of members may post photos of the celebrity on their profiles and matching would indicate that they are all the same user, when in fact, they are different users. There is a need for systems and methods for determining identity of a person in a query image with enhanced accuracy.

BRIEF DESCRIPTION OF THE DRAWINGS

References will be made to embodiments of the present disclosure, examples of which may be illustrated in the accompanying figures. These figures are intended to be illustrative, not limiting. Although the present disclosure is generally described in the context of these embodiments, it should be understood that it is not intended to limit the scope of the present disclosure to these particular embodiments.

DETAILED DESCRIPTION OF THE EMBODIMENTS

In the following description, for purposes of explanation, specific details are set forth in order to provide an understanding of the present disclosure. It will be apparent, however, to one skilled in the art that the present disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or nodes, shown in diagrams are illustrative of exemplary embodiments of the disclosure and are meant to avoid obscuring the disclosure. It shall also be understood that throughout this discussion that components may be described as separate functional units, which may have sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between networks and clients within the figures are not intended to be limited to direct connections. It shall also be noted that the terms "connected" or "communicatively coupled" shall be understood to include direct connections, indirect connections through one or more intermediary devices, and wireless connections.

Furthermore, one skilled in the art shall recognize: (1) that certain steps may optionally be performed; (2) that steps may not be limited to the specific order set forth herein; and (3) that certain steps may be performed in different orders, including being done contemporaneously.

Reference in the specification to "one embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," or "in embodiments" in various places in the specification are not necessarily all referring to the same embodiment or embodiments.

The use of certain terms in various places in the specification is for illustration and should not be construed as limiting. A service or database is not limited to a single service or database; usage of these terms may refer to a grouping of related services or databases, which may be distributed or aggregated.

Figure 1:
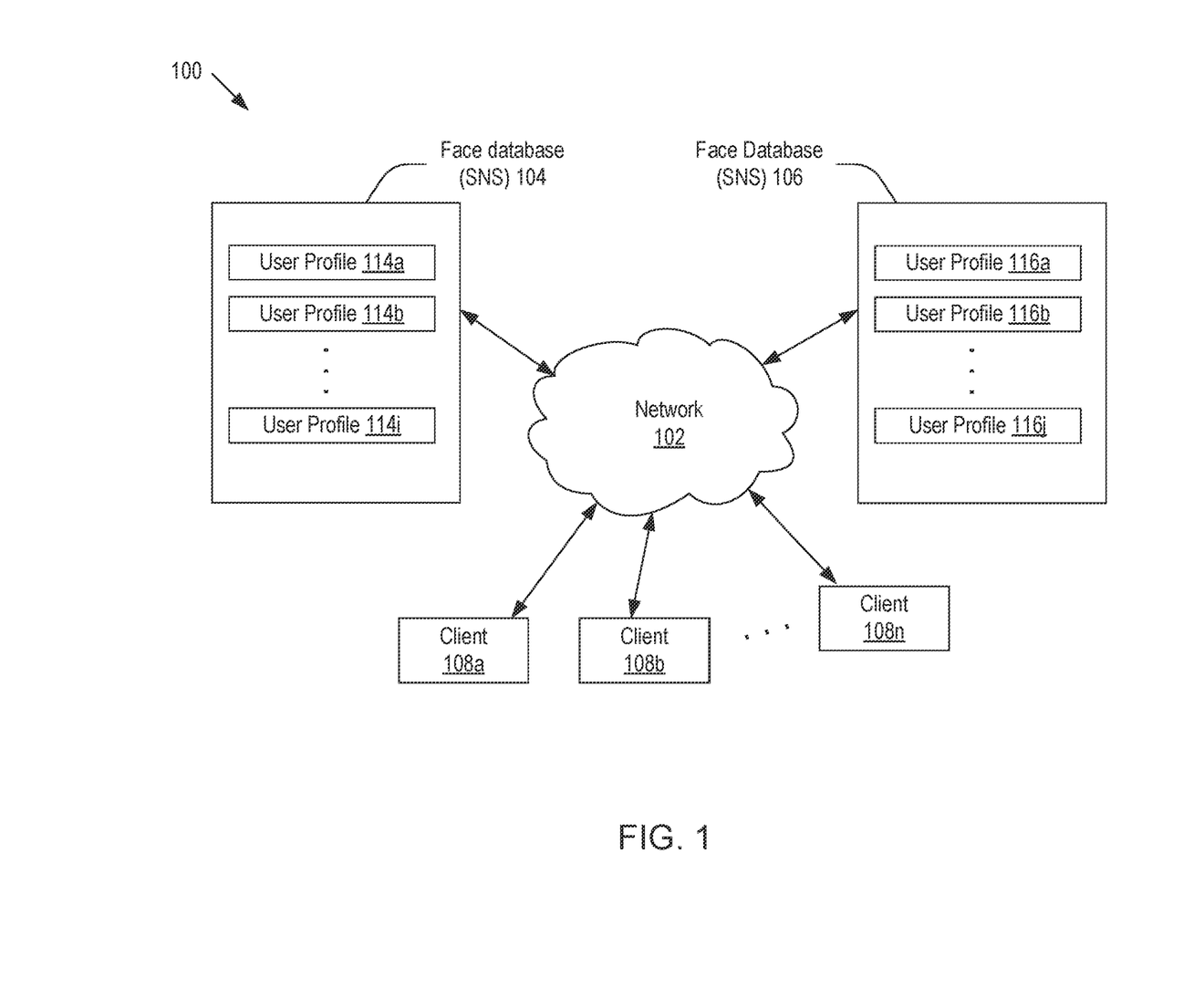
FIG. 1 shows a schematic diagram of a network environment according to embodiments of the present disclosure.

FIG. 1 shows a schematic diagram of a network environment 100 according to embodiments of the present disclosure. As depicted in FIG. 1, one or more image databases 104 and 106, are connected to a network 102, such as the Internet. In embodiments, image databases 104 and 106 may be any type of database that includes image(s) of the users, such as human resources databases, government databases (e.g., DMV databases), picture databases, social networking sites (SNS), and the like. In the illustrated embodiment, image databases 104 and 106 are depicted as SNS databases, though should be apparent to those of ordinary skill in the art that other suitable types of databases that include images may be used in place of the SNS. The databases 104 and 106 may allow the users to create user profiles 114a-114i and 116a-116j. Even though only two facial image databases (or in short, face databases or databases) are shown in FIG. 1, it should be apparent to those of ordinary skill in the art that any number of databases may be connected to the network 102. It should also be noted that reference to a face database should be understood that the database may include more than just images.

The users (or, equivalently members) may use a client devices 108a-108n (or, in short, clients) to create the user profiles, upload photos or video, and otherwise use the services of the site or service (such as, send messages, keep in touch with friends, engage services, etc.). The term "user profile" refers to some or all data associated with a user, typically at least part of which is provided as part of establishing an account with an SNS or other service or site, that helps identify the user; such information may include unique identifiers, personal information, photos, videos, messages and so on, some of which may have been created and uploaded to the user's account via one or more clients 108a-108n. A client 108a-108n may be a desktop computer, laptop computer, mobile device, or other computing device that has a capability to communicate data with the SNSs 104 and 106 via the network 102. The terms "photo" and "image" may be used interchangeably and refer to digital image from which features are extracted. Also, the term "face" refers to a whole face or a partial face.

In embodiments, each SNS, e.g. 106, may include one or more servers/computers and software programs that allow the users to communicate with other users. The SNS 106 may also include a database(s) for storing data of the user profiles 116a-116j. A user may create a user profile in more than one SNS and/or may create multiple user profiles in the same SNS. In embodiments, the SNS 106 may allocate a virtual bulletin board to each user so that the user can leave information, such as message, photos, and video, on the virtual bulletin board and the other members of the SNS 106 may access the information posted on the virtual bulletin board.

In embodiments, one or more photos associated with a user profile, e.g. 116a, may be uploaded from one or more of the clients 108a-108n. In embodiments, the bulletin board may have an interactive album feature that allows the other members to comment on the photos and identify (tag) people in the photos. In embodiments, the photos may be published in a news feed, which is distributed in real-time to the other members.

In embodiments, each SNS may provide a range of privacy options to its members. Each member may make all his communications accessible to every other member, he may block specific connections, or he may keep all his communications private. In embodiments, each member may choose whether or not to be searchable, decide which parts of his profile are public, decide what not to put in his news feed and determine exactly who can see its posts.

Figure 2:
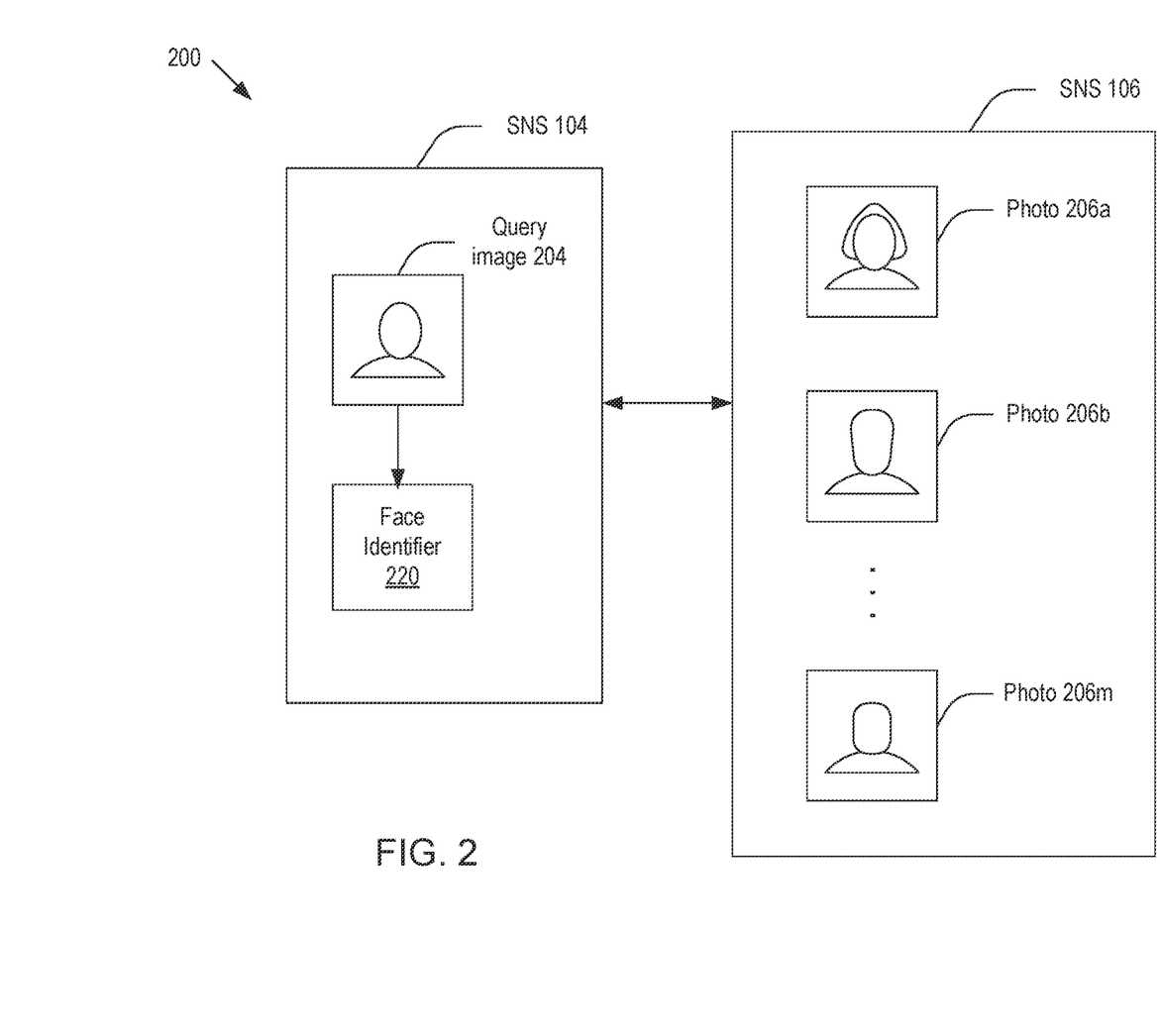
FIG. 2 shows a query image in a first database and images in a second database that are compared with the query image according to embodiments of the present disclosure.

In embodiments, the SNS 104 may identify a person in a query image using the photos that are stored in the SNS 106. FIG. 2 shows a query image 204 in the SNS 104 and images 206a-206m that are stored in the SNS 106 and compared to the query image according to embodiments of the present disclosure.

In embodiments, the face identifier 220 may identify the person in the query image 204 by comparing it against the photos 206a-206m in the SNS 106 via the network 102. In embodiments, the face identifier 220 may extract features of the query image and generate a feature vector that includes the extracted features. Hereinafter, this feature vector is termed as an original feature vector. In embodiment, the length of the original feature vector may be 128 bytes, and each byte may correspond to a feature, although other vector sizes may be used. In embodiments, the distance between two feature vectors in the feature vector space represents a level of match between two faces corresponding to the two feature vectors, i.e., the closer the two feature vectors are in the vector space, the more likely the persons in the two photos are the same person.

In embodiments, each of the query image 204 and images 206a-206m may be a still image/photo, a video, or a still frame taken from a video, and the face identifier 220 may identify the person in the query image by comparing it against the images 206a-206m in the SNS 106. In the following sections, for the purpose of illustration, the query image 204 and images 206a-206 are assumed to be photos. However, it should be apparent to those of ordinary skill in the art that the face identifier 220 may be used to identify a person in a photo or a still frame taken from a video.

The face identifier 220 may compare the original feature vector of the query image 204 with the original feature vectors for the photos 206a-206m. If one of the photos 206a-206m (e.g., 206b) matches the query image, the user profile associated with the photo 206b may be used to identify the person in the query image 204. In embodiments, the face identifier 220 may find the match by selecting a photo that is closest to the query image 204 in the original feature vector space, although other classifications of matching may be used. This approach may be useful when the original feature vector of the photo 206b is very close to the original feature vector of the query image 204 in the feature vector space while the original feature vectors of other photos 206a and 206c-206m are far away from the original feature vector of the query image 204.

The face identifier 220 may be applied to identify a person in a query image by finding a match in a database in which the individual in the photo and the identity of the associated individual have a high degree of accuracy/trustworthiness, such as a picture directory, a driver's license database, and the like. In such a case, the face in the query image may be identified with high precision since it is unlikely that there are going to be duplicates of a face in the database, because such databases are highly curated (e.g., it is unlikely that a single person will have multiple different drivers' licenses, etc.). However, the query image 204 may have been taken at a different angle and/or have a different size from the photo 206b, which may increase the possibility that the face identifier 220 misses the match. In other cases, it may be possible that the face in the query image 204 may be similar to a celebrity whose photos are uploaded by a large number of members of the SNS 106 in their user profiles. In such cases, the original feature vectors of the photos 206 are clustered, making it difficult to find a correct match. Also, each of the members of the SNS 106 may upload multiple photos, which may significantly increase the number of photos 206 to be processed by the face identifier 220. To address such problems, in embodiments, the face identifier 220 may process the original feature vectors before inputting to a trained decision tree that calculates a match probability value.

Figure 3:
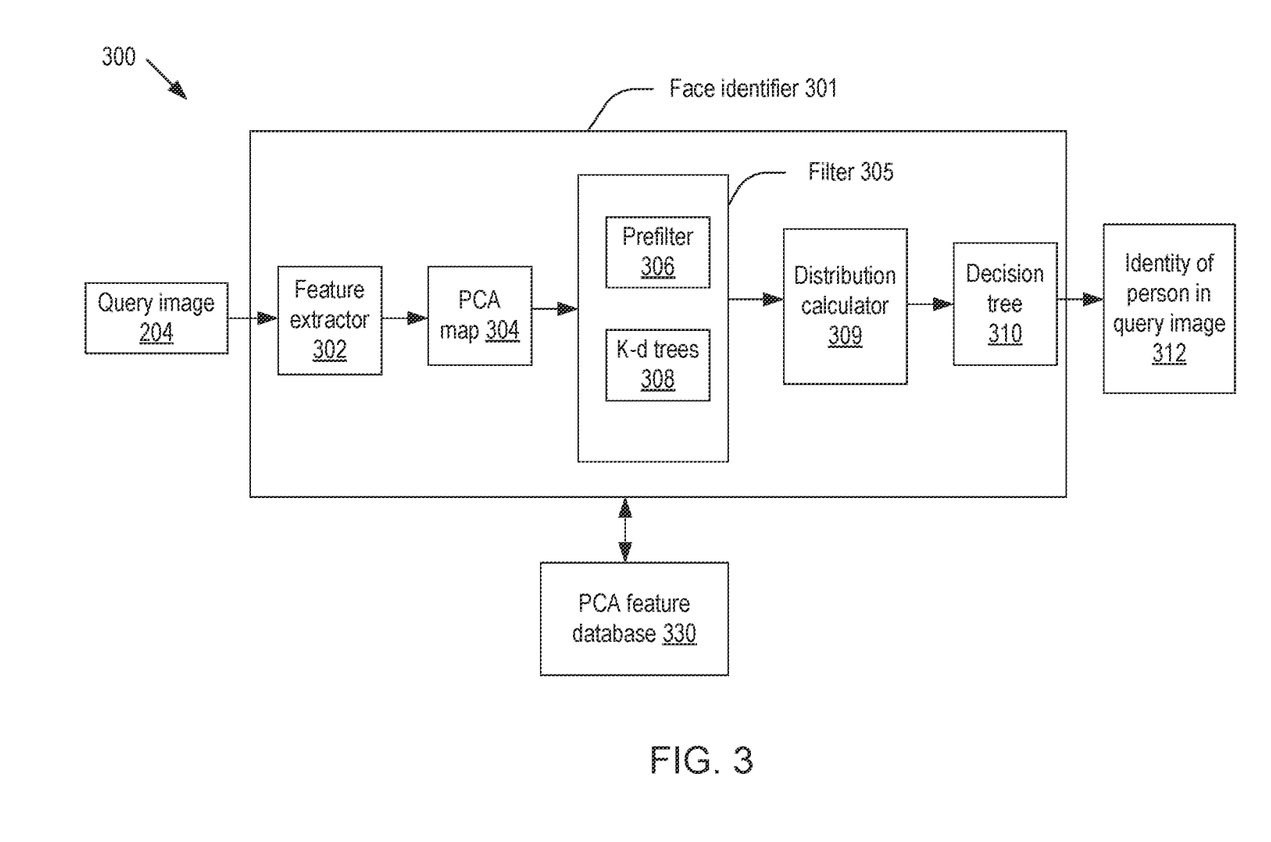
FIG. 3 shows a functional block diagram of a face identifier according to embodiments of the present disclosure.

FIG. 3 shows a functional block diagram 300 of a face identifier 301 according to embodiments of the present disclosure. As depicted, the face identifier 301 may include: a feature extractor 302 for extracting features from images; a principal component analysis (PCA) map 304 for reducing the dimension of extracted feature vectors; a filter 305 for selecting a set of candidate features vectors from among a large number of feature vectors (i.e., the filter helps reduce the search space); and a trained decision tree 310 for calculating a probability of match and returning a match if a match condition is met (e.g., if the probability exceeds a threshold value).

In embodiments, the face identifier 301 may be communicatively coupled to a database (e.g., an SNS), such as by the network 102, or included in the database. For a given query image 204 that includes a face to be identified, the feature extractor 302 extracts features of the face and generate an original feature vector for the face in the query image. In embodiments, OpenFace (https://cmusatyalab.github.io/openface/), which is an open source face extraction library, may be used to obtain the original feature vector, although other feature extractors may be used. In embodiments, the length of the original feature vector may be 128 bytes, although other vector sizes may be used.

Because an image database may store huge numbers of images, possibly even billions of images, the length of the original feature vectors of the images may affect the amount of computational time and computer resources (e.g., data storage) for the identification process. Accordingly, in embodiments, the dimensions of the original feature vectors may be reduced by using principal component analysis (PCA). In embodiments, the PCA map 304 is used to reduce the dimensionality of the original feature vectors, thereby reducing storage requirements and computation resources, but does not significantly compromise robustness and accuracy in the matching process. In embodiments, the length of the original feature vector may be reduced to 32 bytes, i.e., only 32 features among 128 features may be selected and used in identifying the face. Hereinafter, the phrase "PCA feature vector" refers to vector output from a PCA map, such as PCA map 304, which has a dimensionality that is less than the dimensionality of the corresponding original feature vector. Also, the phrase "query feature vector" may, depending upon an embodiments, refer to an original feature vector or a PCA feature vector of a query image, such as the query image 204.

In embodiments, the PCA map 304, which performs dimensionality reduction, may be trained in advance. The PCA map 304 is trained using a set of original feature vectors as input. Based on the input vectors, the PCA map can determine a dimensionality reduction of the original feature vector that does not significantly compromise the robustness in differentiating the original feature vectors from each other. That is, a tradeoff between the number of dimensions of the PCA feature vectors and the robustness in differentiating the original feature vectors from each other may be considered when setting a final PCA feature vector size.

Figure 7:
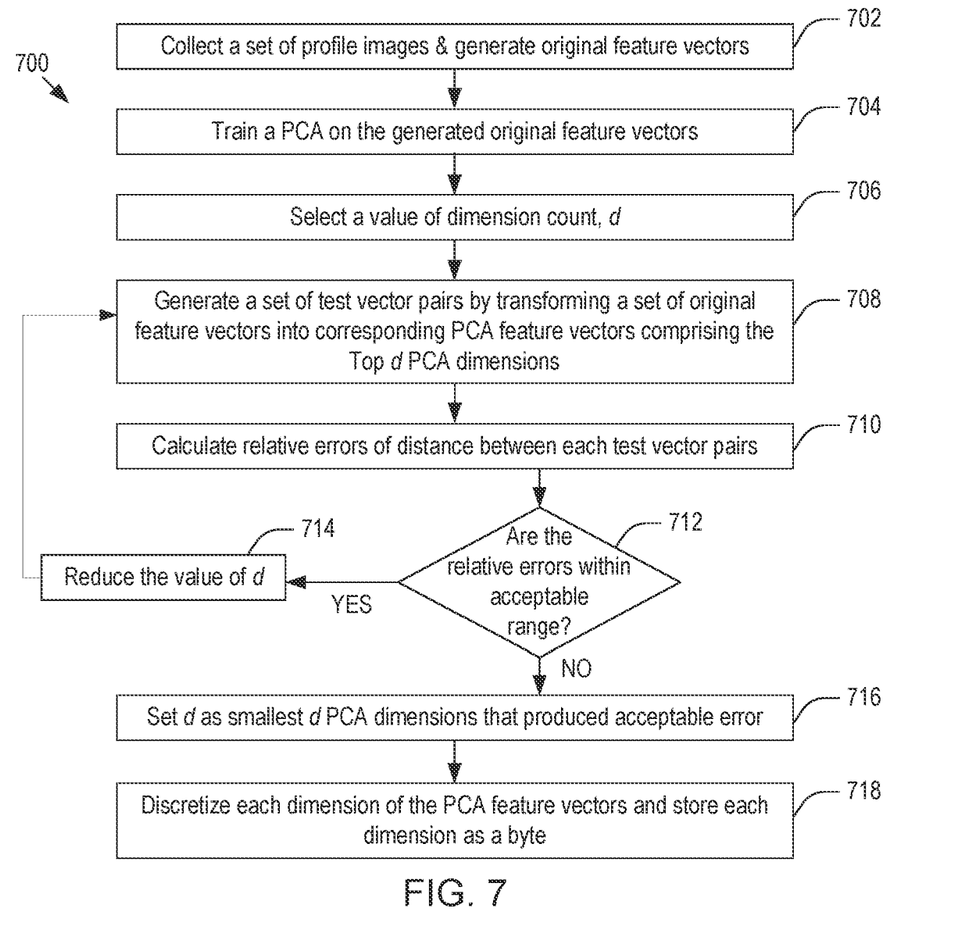
FIG. 7 shows a flowchart of an illustrative process for generating a principal component analysis (PCA) feature vector according to embodiments of the present disclosure.

FIG. 7 shows a flowchart 700 of an illustrative process for generating a PCA feature vector according to embodiments of the present disclosure. At step 702, a set of profile images may be collected or sampled. In embodiments, a subset of images (e.g., 80,000 images) may be selected from among a large number of images in the face database 106, and a set of original feature vectors corresponding to the subset of images may be generated by the feature extractor 302.

At step 704, a PCA map is trained using the set of original feature vectors. Then, in embodiments, a dimension count value, d, is selected (706), where the dimension count d is less than or equal to the dimension of the original feature vectors. In embodiments, a set of test vector pairs are generated (708) by transforming a set of original feature vectors into corresponding PCA feature vectors comprising the top d PCA dimensions, i.e., a set of the original feature vectors are transformed to their top d PCA dimensions. In embodiments, vectors pairs are formed (e.g., pairs of original feature vector and their corresponding PCA feature vector). In embodiments, for each test vector pair, a relative error may be determined (710). For example, in embodiments, the relative error may be defined as:

$$\text{relative error} = |\text{true\_distance} - \text{est\_distance}|/\text{true\_distance}$$

where true_distance is the distance between the two original feature vectors and est_distance is the distance between corresponding two PCA feature vectors.

In embodiments, a check is made (712) whether relative error is within an acceptable range. In embodiments, the acceptable range may be user defined and may be set such that at each test vector pair's relative error must be within an acceptable range, a cumulative value of multiple test vector pairs' relative errors (e.g., a mean, median, or mode) must be within an acceptable range, or some combination thereof. One skilled in the art shall recognize that a number of ways may be used for assessing acceptability (e.g., the maximum relative error, the relative error at the 95th percentile, etc.), and none of which is critical.

In embodiments, if the error is within an acceptable range, the value of the dimension count d may be reduced (714) to examine whether even fewer features may be used to represent an image without significant loss in precision and recall. Then, in embodiments, steps 708-712 may be repeated until an unacceptable relative error level is observed.

In embodiments, when a dimensionality value, d, has been identified that produces an unacceptable level of error, the value of d may be set as the prior value (i.e., the smallest d value of PCA features that produced an acceptable error level at step 712).

In embodiments, all of the original feature vectors may be transformed in to PCA feature vectors using the top d PCA dimensions and stored in a PCA feature database 330.

In embodiments, the PCA feature vectors may be further reduced in size. For example, to save the storage space of the PCA feature database 330, each value of each component (or dimension) of the PCA feature vector may be discretized and stored as a byte so that each PCA feature vector in the PCA feature database 330 may be d-bytes long. For instance, if the dimension values of a dimension of a PCA feature vector has values that range between −0.8 and 0.8, then, the values may be linearly interpolated from [−1.0, 1.0] to the discrete range $\{0, 1, 2, \ldots, 255\}$ so that the dimension is represented as a single byte.

In embodiments, the PCA feature database 330 may be located in the SNS 106 or coupled/connected to the SNS 106 via the network 102. When the PCA feature vector for the query image 204 is generated, the filter 305 may access the PCA feature database 330 and narrow down the search space.

In embodiments, if the query image 204 has one or more index parameters, the prefilter 306 may filter out the PCA feature vectors in the PCA feature database 330 using an index parameter or parameters to thereby narrow down the search space. For instance, if the name of the person in the query image 204 is known to be "John Smith" (for example because the image is associated with a user profile with that name), the prefilter 306 may select only the feature vectors associated with "John Smith" among the PCA feature vectors in the database 330. In embodiments, the PCA feature vectors of images, which are associated with user profiles that are associated with a "John Smith" identifier or index, may be retrieved from the PCA feature database 330 as candidate feature vectors. In embodiments, the candidate PCA feature vectors may be extended to include feature vectors of images from user profiles associated with John Smith, such as his friends. It is noted that other suitable index parameters, such as hobby, approximate name, geographic location, geo matching, or other data or identifiers, may be used to select candidate feature vectors from the PCA feature database 330. It should be noted that, in embodiments, the phrase "candidate feature vectors" refers to one or more PCA feature vectors but that in other embodiments it may be other features vectors, such as an original feature vector.

In embodiments, other prefiltering may alternatively or additional be performed. For example, in embodiments, if the query image 204 does not have any index parameter, one or more k-d trees 308 may be used as a prefilter 306 to search over the PCA feature database 330 and select candidate feature vectors. Each of the k-d trees (which is short for k-dimensional tree) 308 is a space-partitioning data structure for organizing points in a k-dimensional space, where k is an integer less than or equal to the dimension of the PCA feature vector.

Figure 4:
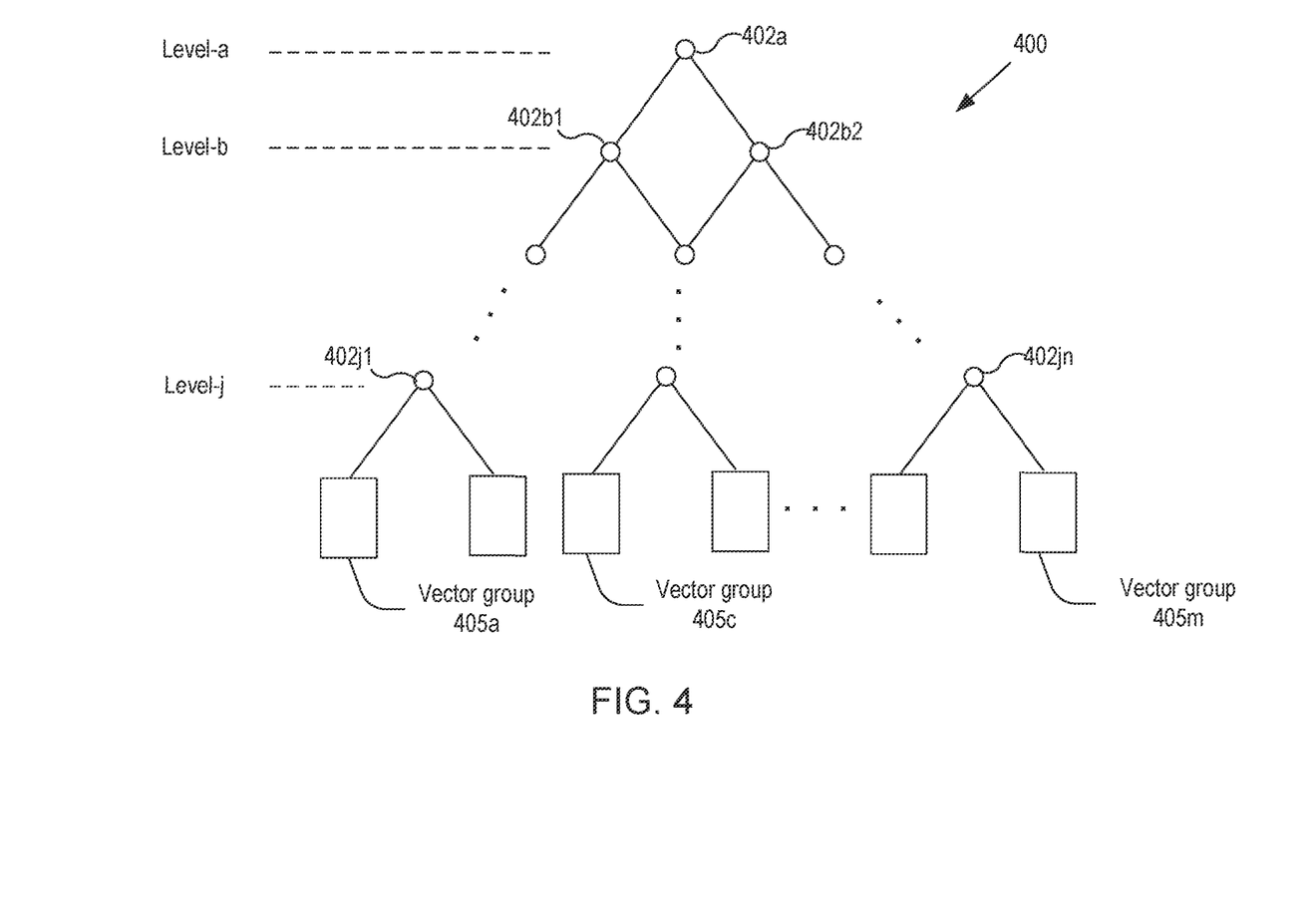
FIG. 4 shows a schematic diagram of a k-dimensional tree (also referred to as a k-d tree) according to embodiments of the present disclosure.

FIG. 4 shows a schematic diagram of a k-d tree 400 that may be used in embodiments of the present disclosure. The k-d tree 400 is a useful data structure for searches involving a multidimensional search key and a special case of a binary space partitioning tree. As depicted, in embodiments, the k-d tree 400 may include multiple levels, level a-level j, and each level may include one or more nodes. For instance, the k-d tree 400 may include a root node 402a at level-a and leaf nodes 402j1-402jn at level-j. In embodiments, each node may be associated with a condition for one of the elements in the feature vector.

In embodiments, the k-d tree 400 may be generated before it is used to reduce the search space, i.e., the PCA feature vectors of the images 206a-206m may be added to the k-d tree 400 in advance. In embodiments, each PCA vector may be added by traversing the k-d tree 400: starting from the root node 402a and moving to either left or right at each child node until it reaches one of the vector groups 405a-405m. In embodiments, a library like FLANN (Fast Library for Approximate Nearest Neighbors) is used to train a set of k-d trees for answering nearest-neighbor queries.

It is noted that more than one k-d tree may be used by the filter 305. In embodiments, the number of the k-d trees 308 (and/or the number of nodes in each k-d tree) may be a function of the size of the PCA feature database 330 and distribution of the PCA feature vectors in the database 330. In embodiments, the number of the k-d trees 308 and the number of searches in each tree may be balanced so as to avoid going down to a wrong branch in the k-d trees 308 and omitting the correct match. In embodiments, using the k-d trees 308 that are prepared in advance, the filter 305 may select a vector group (e.g., 405c) that corresponds to the query feature vector, where the query vector refers to the PCA feature vector of the query image 204. In embodiments, the vectors in the selected vector group 405c are considered as candidate feature vectors.

In embodiments, the candidate feature vectors selected by the filter 305 may be input to a distribution calculator 309. In embodiments, the distribution calculator 309 may calculate the distance between the query feature vector and each of the candidate feature vectors that are selected among the PCA feature database 330 by the filter 305. Also, the distribution calculator 309 may select a set of shortest distances among the distances between the query feature vector and the candidate feature vectors. Then, in embodiments, using the set of shortest distances, the distribution calculator 309 may generate a decision tree feature vector, where the decision tree feature vector includes the set of shortest distances and ratios of the set of shortest distances.

For the purposes of illustration, the number of shortest distances is set at four, i.e., the distribution calculator 309 may select the top four shortest distances, although different numbers may be used. Also, it is assumed, for illustration purposes, that the four shortest distances are [2, 7, 7, 8], with $d_1$ being the smallest of the four distances. Then, in embodiments, the decision tree feature vector, X, generated by the distribution calculator 309 may be X=[2, 7, 7, 8, 7/2, 7/2, 8/2], where the last three components of the decision tree feature vector represent the ratios of the three distances to the first distance (i.e., $X=[d_1, d_2, d_3, d_4, d_2/d_1, d_3/d_1, d_4/d_1]$. One of the motivations for including the ratios in the decision tree feature vector is that, for a correct match, these ratios should be large while, for a false match or an inconclusive match, they tend to be small, i.e., the feature vectors are clustered. In embodiments, if the decision tree vector includes N feature vectors, the dimension of the distance feature vector may be (2*N)−1.

In embodiments, the decision tree feature vector generated by the distribution calculator 309 may be input to the decision tree, which may be a trained model, 310. In embodiments, the decision tree 310 calculates a score using the decision tree feature vector, where the score represents the probability that a correct match is found (i.e., the score represents the match probability value). If the score exceeds a threshold value, it is determined that the person in the query image 204 is likely the same person as the person associated with feature vector that produced the shortest distance in the decision tree feature vector. In embodiments, if the nearest PCA feature vector in the PCA feature database is a correct match to the query feature vector, the face identifier 301 may define a label, y, to be positive ("1"). Otherwise, the face identifier 301 may define the label to negative ("0"). In embodiments, the face identifier 301 may generate a pair {X, y}, where the X is the decision tree feature vector and y is the label.

Thus, in embodiments, if the decision tree 310 determines that a feature vector associated with an image, e.g. 206b, in the SNS 106 is a correct match, the identity 312 of the person in the query image 204 may be obtained from the user profile associated with the photo 206b, and/or profiles in different network may be linked due to the matching of images associated with the corresponding profiles.

Figure 8:
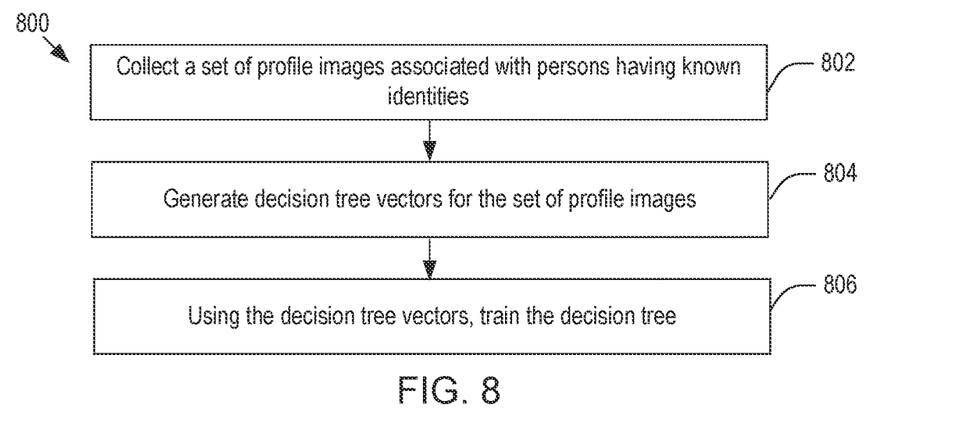
FIG. 8 shows a flowchart of an illustrative process for training a decision tree according to embodiments of the present disclosure.

In embodiments, the decision tree 310 may be trained in advance. FIG. 8 shows a flowchart 800 of an illustrative process for training a decision tree according to embodiments of the present disclosure. At step 802, a set of profile images associated with persons having known identities may be collected, which will form a ground truth dataset. For example, a corpus of known matched photos between two social networks, Network A and Network B (e.g., Twitter and Facebook) may be used where there are clear indicators that match the profiles between the two networks, such as unique identifiers (like email address, Twitter handle, etc.) or the user has posted a link in one profile (e.g., Network A profile) to their corresponding profile in the other network (e.g., Network B profile). Since the identities of the faces in the images of the ground truth data are already known (or at least that they are of the same person), the operator of the decision tree 310 may train the decision tree by inputting the decision tree feature vectors associated with the images of the ground truth data into the decision tree.

At step 804, the decision tree vectors for the set of profile images may be generated, where each decision tree vector includes the top N shortest distances, as discussed above in conjunction with the distribution calculator 309. If the nearest feature vector for an image in Network A is the correct match for the corresponding image in Network B, then a label, y, is assigned a positive (e.g., $y_i=1$); otherwise, the label is assigned a negative value (e.g., $y_i=0$). In embodiments, the face identifier 301 may generate a pair $\{X_i, y_i\}$, where the X is the decision tree feature vector and y is the label. This set of feature vector-label pairs forms a ground truth dataset that may be used to train (806) the decision tree 310. It should be noted that standard software libraries may be used to train the decision tree to predict a score for a given distance distribution X. In embodiments, for the trained decision tree, a score threshold may be chosen by making a precision-recall plot, or the score may be used directly as the probability that the matched face is correct.

Figure 5:
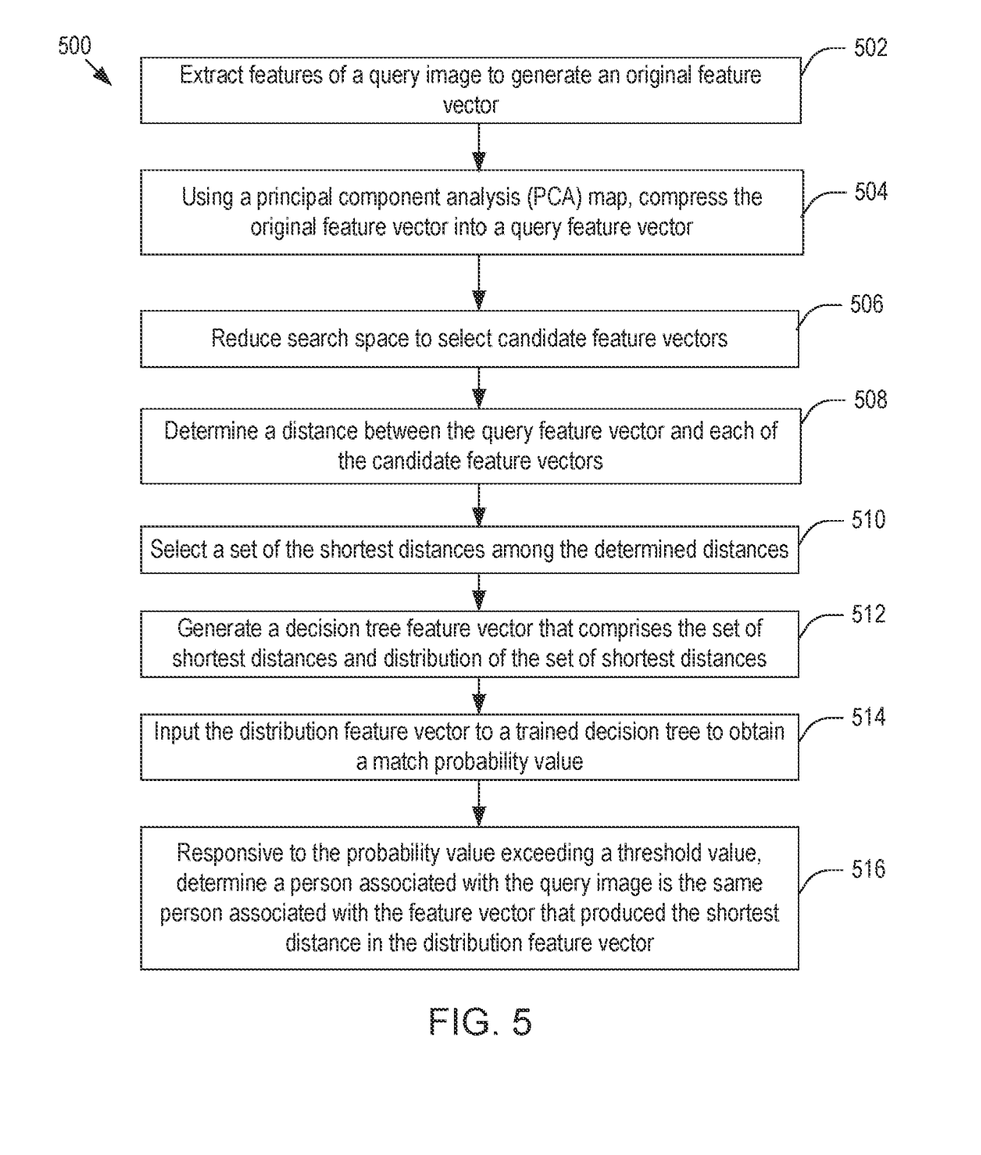
FIG. 5 shows a flowchart of an illustrative process for identifying a person in a query image according to embodiments of the present disclosure.

FIG. 5 shows a flowchart 500 of an illustrative process for identifying a person in a query image according to embodiments of the present disclosure. At step 502, the feature extractor 302 may extract features of the face in the query image 204 to generate an original feature vector of the face in the query image. In embodiments, the dimension of the original feature vector may be reduced (504) by the PCA map 304. In embodiments, the vectors generated by the PCA map 304, which are referred to as PCA feature vectors, have a dimension that is less than the original feature vectors inputted to the PCA map.

In embodiments, a filter 305 may be used (506) to narrow the search space so that candidate feature vectors can be selected from the large number of PCA feature vectors stored in the PCA feature database 330. In embodiments, using an index parameter associated with the query image 204, the prefilter 306 may filter out the PCA feature vectors in the PCA feature database 330 to thereby select candidate feature vectors from the PCA feature database 330. In embodiments, one or more k-d trees 308 may be used to select candidate feature vectors from the PCA feature database 330. One skilled in the art shall recognize that other filtering techniques may be alternatively and/or additionally employed.

In embodiments, a distribution calculator 309 calculates (508) the distance between the query feature vector and each of the candidate feature vectors. In embodiments, the distribution calculator 309 also selects a set of shortest distances among the distances between the query feature vector and the candidate feature vectors. Next, in embodiments, the distribution calculator 309 generates (512) a decision tree feature vector that includes the set of shortest distances and a distribution of the set of shortest distances.

In embodiments, the decision tree feature vector is input (514) to a trained decision tree 310 to obtain a score for the decision tree feature vector. In embodiments, the decision tree computes a score that represents the probability that a correct match is found. Responsive to the score exceeding a threshold value, it is determined (516) that the person in the query image 204 is the same person associated with the feature vector in the decision tree feature vector that had the smallest distance. In embodiments, if the nearest PCA feature vector is a correct match to the query feature vector, the identity of the person in the query image 204 may be obtained from the corresponding user profile associated with that PCA feature vector.

Figure 6:
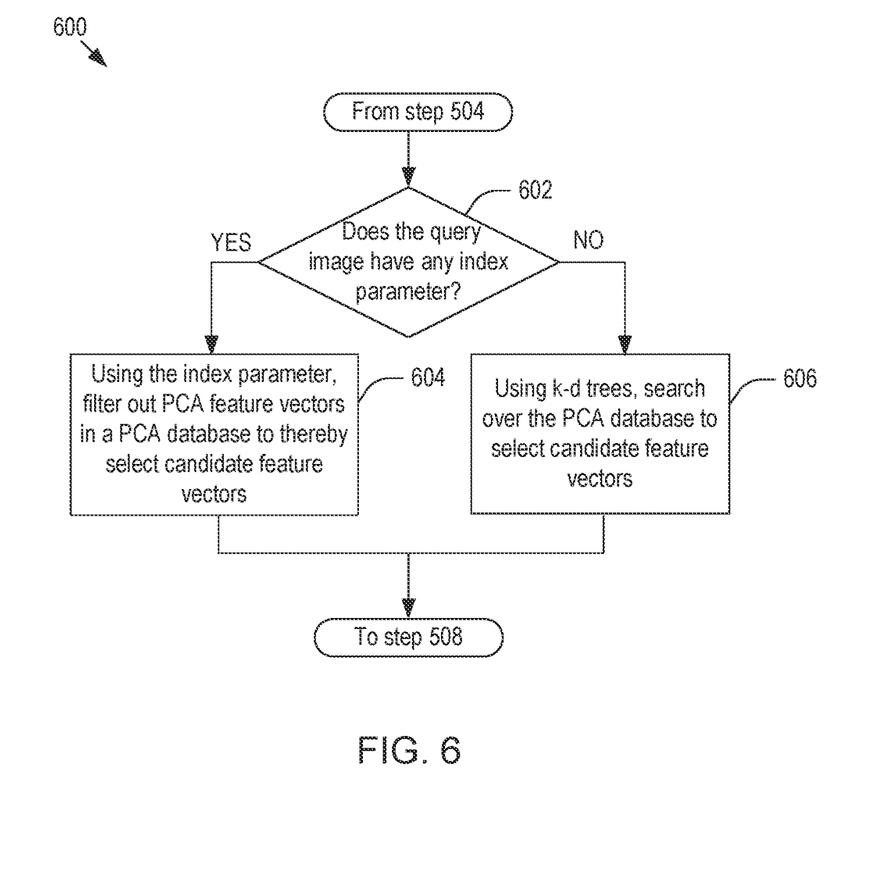
FIG. 6 shows a flowchart of an illustrative process for reducing search space according to embodiments of the present disclosure.

FIG. 6 shows a flowchart 600 of an illustrative process for reducing search space at step 506 according to embodiments of the present disclosure. At step 602, it is determined whether the query image 204 has an index parameter. If the query image 204 has an index parameter, the prefilter 306 may filter out the PCA feature vectors in the PCA feature database 330 to thereby select candidate feature vectors from the PCA feature database 330 at step 604. Then, the process proceeds to step 508. If the query image 204 does not have any index parameter, one or more k-d trees 308 may be used to select candidate feature vectors from the PCA feature database 330 at step 606.

It is noted that the person in the query image 204 may be identified using the photos in the SNS 104 instead of the photos 206a-206m in the SNS 106. For instance, one user may have created more than one user profile under slightly different names. In such a case, the identification process described in conjunction with FIGS. 2-8 may be used to find duplicates/matches of the query image 204 in the SNS 104 where the query image 204 is located.

In embodiments, one or more computing system may be configured to perform one or more of the methods, functions, and/or operations presented herein. Systems that implement at least one or more of the methods, functions, and/or operations described herein may have an application or applications operating on at least one computing system. The computing system may have one or more computers and one or more databases. The computer system may be a single system, a distributed system, a cloud-based computer system, or a combination thereof.

It shall be noted that the present disclosure may be implemented in any instruction-execution/computing device or system capable of processing data, including, without limitation phones, laptop computers, desktop computers, and servers. The present disclosure may also be implemented into other computing devices and systems. Furthermore, aspects of the present disclosure may be implemented in a wide variety of ways including software (including firmware), hardware, or combinations thereof. For example, the functions to practice various aspects of the present disclosure may be performed by components that are implemented in a wide variety of ways including discrete logic components, one or more application specific integrated circuits (ASICs), and/or program-controlled processors. It shall be noted that the manner in which these items are implemented is not critical to the present disclosure.

Figure 9:
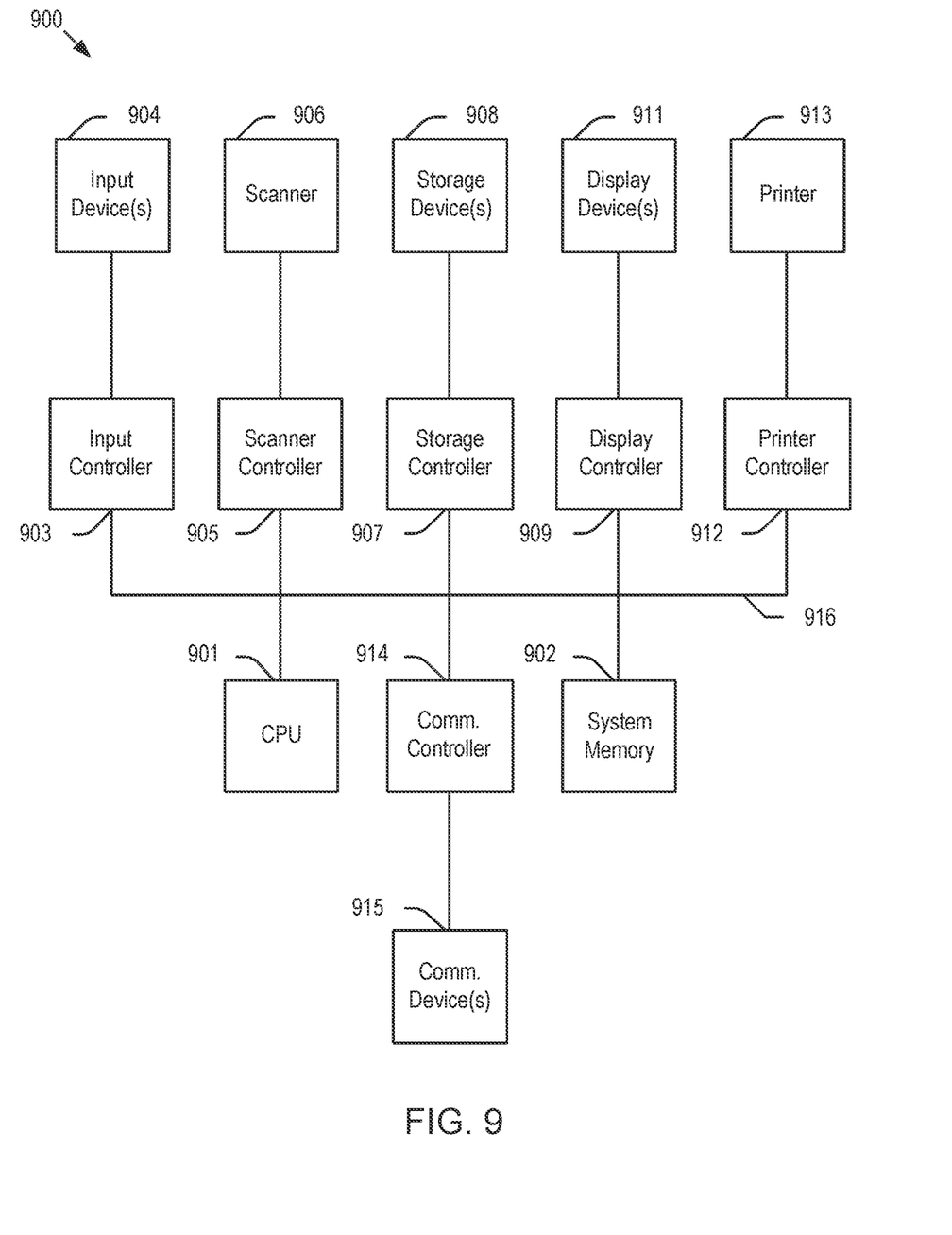
FIG. 9 shows a computing system according to embodiments of the present disclosure.

Having described the details of the disclosure, an exemplary system 900, which may be used to implement one or more aspects of the present disclosure, will now be described with reference to FIG. 9. As illustrated in FIG. 9, system 900 includes a central processing unit (CPU) 901 that provides computing resources and controls the computer. CPU 901 may be implemented with a microprocessor or the like; system 900 may also include one or more graphics processors and/or floating point coprocessors for mathematical computations. System 900 may also include a system memory 902, which may be in the form of random-access memory (RAM) and/or read-only memory (ROM).

A number of controllers and peripheral devices may also be provided, as shown in FIG. 9. An input controller 903 represents an interface to various input device(s) 904, such as a keyboard, mouse, or stylus. There may also be a scanner controller 905, which communicates with a scanner 906. System 900 may also include a storage controller 907 for interfacing with one or more storage devices 908 each of which includes a storage medium such as magnetic tape or disk, or an optical medium that might be used to record programs of instructions for operating systems, utilities and applications which may include embodiments of programs that implement various aspects of the present disclosure. Storage device(s) 908 may also be used to store processed data or data to be processed in accordance with the present disclosure. System 900 may also include a display controller 909 for providing an interface to a display device 911, which may be a cathode ray tube (CRT), a thin film transistor (TFT) display, or other type of display. System 900 may also include a printer controller 912 for communicating with a printer 913. A communications controller 914 may interface with one or more communication devices 915, which enables system 900 to connect to remote devices through any of a variety of networks including the Internet, an Ethernet cloud, an Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 916, which may represent more than one physical bus. However, various system components may or may not be in physical proximity to one another. For example, input data and/or output data may be remotely transmitted from one physical location to another. In addition, programs that implement various aspects of this disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims, below, may be arranged differently including having multiple dependencies, configurations, and combinations.

What is claimed is:

1. A method comprising:
   generating a query feature vector based at least in part on a query image;
   determining a set of distances that comprises a respective distance between the query feature vector and each respective candidate feature vector of a set of candidate feature vectors;
   generating a decision tree vector that comprises a selected subset of the determined set of distances;
   inputting the decision tree vector to a trained decision tree to obtain a probability value; and
   determining, in response to the probability value satisfying a threshold value, that an entity associated with the query image is a same entity that is associated with the respective candidate feature vector that produced a shortest distance of the selected subset of the determined set of distances included in the decision tree vector.

2. The method of claim 1, further comprising:
   collecting a set of profile images;
   generating a set of original feature vectors based on the set of profile images; and
   training a principal component analysis (PCA) on the set of original feature vectors.

3. The method of claim 2, further comprising:
   training a model using a set of features that correspond to a set of candidate images associated with entities having known identities.

4. The method of claim 2, further comprising:
   selecting a value of a dimension count;
   generating a set of test vector pairs by transforming the set of original feature vectors into corresponding PCA feature vectors comprising a set of top PCA dimensions; and
   calculating relative errors of distance between each test vector pairs.

5. The method of claim 4, further comprising:
   determining that the relative errors are within an acceptable range;
   setting a particular value as a smallest amount of PCA dimensions that produced an acceptable range; and
   discretizing each dimension of the PCA feature vectors and storing each dimension as a byte.

6. The method of claim 1, further comprising:
   generating a query feature for a query image, the query feature including one or more features about the entity extracted from the query image; and
   determining a set of similarity measures between the query feature and each of a set of candidate features that correspond to a set of candidate images.

7. The method of claim 6, further comprising:
   reducing, prior to determining the set of similarity measures, a search space comprising a plurality of features to obtain the set of candidate features.

8. The method of claim 7, further comprising:
   using an index parameter associated with the query image, selecting the set of candidate features among the plurality of features.

9. The method of claim 7, further comprising:
   using one or more k-d trees, selecting the set of candidate images among the plurality of features.

10. The method of claim 1, further comprising:
    generating an original feature that includes one or more features extracted from the query image; and
    converting the original feature into a query feature by reducing dimensionality of the original feature; and
    inputting the original feature to a principal component analysis map to obtain the query feature.

11. A system comprising:
    one or more processors; and
    at least one memory including instructions that, when executed by the one or more processors, cause the one or more processors to perform operations comprising:
    generating a query feature vector based at least in part on a query image;
    determining a set of distances that comprises a respective distance between the query feature vector and each respective candidate feature vector of a set of candidate feature vectors;
    generating a decision tree vector that comprises a selected subset of the determined set of distances and distribution of the set of short distances;
    inputting the decision tree vector to a trained decision tree to obtain a probability value; and
    determining, in response to the probability value satisfying a threshold value, that an entity associated with the query image is a same entity that is associated with the respective candidate feature vector that produced a shortest distance of the selected subset of the determined set of distances included in the decision tree vector.

12. The system of claim 11, wherein the operations further comprise:
    collecting a set of profile images;
    generating a set of original feature vectors based on the set of profile images; and
    training a principal component analysis (PCA) on the set of original feature vectors.

13. The system of claim 12, wherein the operations further comprise:
    training a model using a set of features that correspond to a set of candidate images associated with entities having known identities.

14. The system of claim 12, wherein the operations further comprise:
    selecting a value of a dimension count;
    generating a set of test vector pairs by transforming the set of original feature vectors into corresponding PCA feature vectors comprising a set of top PCA dimensions; and calculating relative errors of distance between each test vector pairs.

15. The system of claim 14, wherein the operations further comprise:
   determining that the relative errors are within an acceptable range;
   setting a particular value as a smallest amount of PCA dimensions that produced an acceptable range; and
   discretizing each dimension of the PCA feature vectors and storing each dimension as a byte.

16. The system of claim 11, wherein the operations further comprise:
   generating a query feature for a query image, the query feature including one or more features about the entity extracted from the query image; and
   determining a set of similarity measures between the query feature and each of a set of candidate features that correspond to a set of candidate images.

17. The system of claim 16, wherein the operations further comprise:
   reducing, prior to determining the set of similarity measures, a search space comprising a plurality of features to obtain the set of candidate features.

18. The system of claim 17, wherein the operations further comprise:
   using an index parameter associated with the query image, selecting the set of candidate features among the plurality of features.

19. The system of claim 11, wherein the operations further comprise:
   generating an original feature that includes one or more features extracted from the query image; and
   converting the original feature into a query feature by reducing dimensionality of the original feature; and
   inputting the original feature to a principal component analysis map to obtain the query feature.

20. A non-transitory computer-readable medium or media comprising one or more sets of instructions, which causes one or more processors to perform operations comprising:
   generating a query feature vector based at least in part on a query image;
   determining a set of distances that comprises a respective distance between the query feature vector and each respective candidate feature vector of a set of candidate feature vectors;
   generating a decision tree vector that comprises a selected subset of the determined set of distances;
   inputting the decision tree vector to a trained decision tree to obtain a probability value; and
   determining, in response to the probability value satisfying a threshold value, that an entity associated with the query image is a same entity that is associated with the respective candidate feature vector that produced a shortest distance of the selected subset of the determined set of distances included in the decision tree vector.

* * * * *

UNITED STATES PATENT AND TRADEMARK OFFICE
CERTIFICATE OF CORRECTION

| | | |
|---|---|---|
| PATENT NO. | : 11,727,053 B2 | Page 1 of 1 |
| APPLICATION NO. | : 17/231580 | |
| DATED | : August 15, 2023 | |
| INVENTOR(S) | : Pranav Dandekar et al. | |

It is certified that error appears in the above-identified patent and that said Letters Patent is hereby corrected as shown below:

In the Claims

Column 14, Lines 38-39 (Claim 11):
"distances and distribution of the set of short distances"
Should read:
--distances--.

Signed and Sealed this
Ninth Day of April, 2024

*Katherine Kelly Vidal*

Katherine Kelly Vidal
*Director of the United States Patent and Trademark Office*